United States Patent
Rus et al.

(10) Patent No.: US 9,613,127 B1
(45) Date of Patent: Apr. 4, 2017

(54) AUTOMATED LOAD-BALANCING OF PARTITIONS IN ARBITRARILY IMBALANCED DISTRIBUTED MAPREDUCE COMPUTATIONS

(71) Applicant: Quantcast Corporation, San Francisco, CA (US)

(72) Inventors: Silvius V. Rus, Orinda, CA (US); Wei Jiang, San Mateo, CA (US)

(73) Assignee: Quantcast Corporation, San Francisco, CA (US)

( * ) Notice: Subject to any disclaimer, the term of this patent is extended or adjusted under 35 U.S.C. 154(b) by 277 days.

(21) Appl. No.: 14/320,373

(22) Filed: Jun. 30, 2014

(51) Int. Cl.
*G06F 17/30* (2006.01)

(52) U.S. Cl.
CPC ............................ *G06F 17/30598* (2013.01)

(58) Field of Classification Search
CPC ......... G06F 17/30584; G06F 17/30917; G06F 17/30572; G06F 11/3442; G06F 17/30483; G06F 3/0482; G06F 9/4881; G06F 9/5083; G06F 17/30598; G06F 11/362; G05F 17/30575; H04L 29/08882; H04L 67/10; H04L 43/50; G11C 15/046; G11C 29/04; G11C 16/10; G11C 16/26; G11C 16/16
See application file for complete search history.

(56) References Cited

U.S. PATENT DOCUMENTS

| | | | | |
|---|---|---|---|---|
| 7,523,123 B2 * | 4/2009 | Yang | ................. | G06F 17/30498 707/E17.014 |
| 7,650,331 B1 * | 1/2010 | Dean | ..................... | G06F 9/5066 712/203 |
| 8,213,518 B1 * | 7/2012 | Wang | ..................... | H04N 19/44 348/721 |
| 8,510,538 B1 * | 8/2013 | Malewicz | ................. | G06F 7/38 712/220 |
| 8,595,262 B1 * | 11/2013 | Hayden | ............. | G06F 17/30545 370/252 |
| 9,170,848 B1 * | 10/2015 | Goldman | .............. | G06F 9/5066 707/E17.108 |

(Continued)

OTHER PUBLICATIONS

Hua-Fu Li et al.—"Online Mining (Recently) Maximal Frequent Itemsets over Data Streams"—Proceedings of the 15th International Workshop on Research Issues in Data Engineering: Stream Data Mining and Applications (RIDE-SDMA'05)—pp. 1-8.*

(Continued)

*Primary Examiner* — Anh Ly
(74) *Attorney, Agent, or Firm* — Robin W. Reasoner; Renee D. Jacowitz

(57) ABSTRACT

A distributed computing system executes a MapReduce job on streamed data that includes an arbitrary amount of imbalance with respect to the frequency distribution of the data keys in the dataset. A map task module maps the dataset to a coarse partitioning, and generates a list of the top K keys with the highest frequency among the dataset. A sort task module employs a plurality of sorters to read the coarse partitioning and sort the data into buckets by data key. The values for the top K most frequent keys are separated into single-key buckets. The other less frequently occurring keys are assigned to buckets that each have multiple keys assigned to it. Then, more than one worker is assigned to each single-key bucket. The output of the multiple workers assigned to each respective single-key bucket is stitched together.

19 Claims, 3 Drawing Sheets

(56) References Cited

U.S. PATENT DOCUMENTS

| | | | | |
|---|---|---|---|---|
| 2003/0233321 | A1* | 12/2003 | Scolini | G06Q 20/02 705/40 |
| 2007/0198741 | A1* | 8/2007 | Duffy | G06F 17/3089 709/245 |
| 2008/0120314 | A1* | 5/2008 | Yang | G06F 17/30498 707/E17.044 |
| 2009/0031175 | A1* | 1/2009 | Aggarwal | G06F 17/18 714/47.2 |
| 2009/0219404 | A1* | 9/2009 | Kobayashi | H04N 19/619 348/222.1 |
| 2009/0313635 | A1* | 12/2009 | Dasdan | G06F 9/5083 718/105 |
| 2010/0122065 | A1* | 5/2010 | Dean | G06F 17/30445 712/203 |
| 2011/0125805 | A1* | 5/2011 | Ostrovsky | G06F 9/5038 707/803 |
| 2011/0196964 | A1* | 8/2011 | Natarajan | H04L 41/0604 709/224 |
| 2011/0276789 | A1* | 11/2011 | Chambers | G06F 9/445 712/220 |
| 2011/0317982 | A1* | 12/2011 | Xu | G06F 17/30843 386/241 |
| 2012/0297249 | A1* | 11/2012 | Yang | G06F 9/5072 714/19 |
| 2012/0311581 | A1* | 12/2012 | Balmin | G06F 9/5066 718/100 |
| 2013/0024412 | A1* | 1/2013 | Gong | G06N 5/00 706/46 |
| 2013/0024479 | A1* | 1/2013 | Gong | G06F 9/5066 707/798 |
| 2013/0346467 | A1* | 12/2013 | Rosu | G06F 17/30958 709/201 |
| 2014/0123115 | A1* | 5/2014 | Peretz | G06F 11/362 709/224 |
| 2014/0188885 | A1* | 7/2014 | Kulkarni | G06F 17/30949 707/739 |
| 2014/0310476 | A1* | 10/2014 | Kruus | G06F 12/0871 711/133 |
| 2014/0337375 | A1* | 11/2014 | Yue | G06F 17/30424 707/769 |
| 2014/0344195 | A1* | 11/2014 | Drew | G06F 17/30705 706/12 |
| 2015/0088959 | A1* | 3/2015 | Doddavula | H04L 67/14 709/201 |
| 2015/0098542 | A1* | 4/2015 | Yi | H04L 7/0331 375/373 |
| 2015/0149437 | A1* | 5/2015 | Sundarrajan | G06F 17/30442 707/714 |
| 2015/0186493 | A1* | 7/2015 | Balmin | G06F 17/30536 707/609 |
| 2015/0249583 | A1* | 9/2015 | Vojnovic | H04L 43/062 709/224 |
| 2015/0293974 | A1* | 10/2015 | Loo | G06F 17/30516 707/752 |
| 2016/0253366 | A1* | 9/2016 | Hsu | G06K 9/00496 |

OTHER PUBLICATIONS

Hung-chih Yang et al.—"Map-Reduce-Merge: Simplified Relational Data Processing on Large Clusters"—SIGMOD'07, Jun. 12-14, 2007, Beijing, China.—pp. 1029-1040—Beijing, China—Jun. 11-14, 2007.*

Charikar, M. et al., "Finding Frequent Items in Data Streams," Automata, Languages and Programming, ICALP 2002, LNCS 2380, Springer-Verlag Berlin Heidelberg, 2002, pp. 693-703.

* cited by examiner

AUTOMATED LOAD-BALANCING OF PARTITIONS IN ARBITRARILY IMBALANCED DISTRIBUTED MAPREDUCE COMPUTATIONS

BACKGROUND

1. Technical Field

This invention pertains in general to distributed computations, and in particular to load-balancing distributed computations.

2. Description of Related Art

MapReduce is arguably the most popular modern cluster-computing paradigm. Despite its popularity, conventional MapReduce implementations suffer from a fundamental data imbalance problem. Each data item to be processed using MapReduce comprises structured data in (key, value) pairs. During a conventional MapReduce process, items are grouped by the hash value of the data key of each item. Hash functions produce very even distributions among groups when the number of items with the same data key is fairly small compared to the total number of items. However, when the number of items with the same key is fairly large compared to the total number of items, hash functions produce uneven distributions among groups. The MapReduce framework assigns items with the same key to be processed by the same processing unit. Therefore, an uneven distribution among the groups results in some processing units processing more items than other processing units. This is commonly referred to as a "load imbalance" between the processing units, and if left unaddressed, it leads to wasted resources and time.

Consider the example of grouping data records of all the computers on the internet by country in 1998, where country is used as the data key. The group corresponding to the USA would make up about 50% of all of the items. Since all of the items with the same key are processed by the same processing unit, the processing unit assigned to the group corresponding to the USA will be overloaded. As a consequence, the processing speed of the USA data is the rate limiting step in completing the MapReduce job. Even if you have 100 processing units, the MapReduce job will not be complete any faster than 2 processing units, one for the USA data key and the other for the data keys corresponding to all the other countries in the world.

The example above illustrates a load-imbalance problem in a MapReduce job that is left for computer programmers to solve when it arises. First, the programmer needs to recognize that an imbalance is occurring between processing units, and second, the programmer needs to intervene to direct some data associated with the popular keys to other processing units. However, the solutions that a programmer develops for a unique data situation is often very human-resource intensive, can be error-prone, and is not robust to changes in the data over time. If the input data changes, it may cause imbalance in another way (i.e., another key becomes more popular, adding to the workload of a different processing unit), and the programmer's previously implemented solution may in fact be exacerbating the new imbalance.

SUMMARY

Embodiments of the invention solve the MapReduce imbalance problem automatically, with no human intervention, and regardless of the amount of imbalance. A distributed computing system executes a MapReduce job on streamed data that includes an arbitrary amount of imbalance with respect to the frequency distribution of the data keys in the dataset. A map task module employs a plurality of mappers in parallel to map the dataset to a coarse partitioning, and generates a list of the top K data keys with the highest frequency among the dataset as the mappers are executing. The value K is adjustable to accommodate the degree of imbalance that is deemed acceptable and the number of processing units available to devote to the MapReduce job. A sort task module employs a plurality of sorters to read the coarse partitioning and sort the data into buckets by data key. The values for the top K most frequent data keys are separated into single-key buckets. The other less frequently occurring data keys are assigned to buckets that each have multiple data keys assigned to it. Then, a reduce task module assigns more than one worker to each single-key bucket. The number of workers to assign to each single-key bucket can be determined from the respective frequency of the data key separated into the single-key bucket. The output of the multiple workers assigned to each respective single-key bucket is stitched together. Then, in applications requiring a merge, the output across all of the workers is combined to complete the MapReduce job.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Overview

Figure 1:
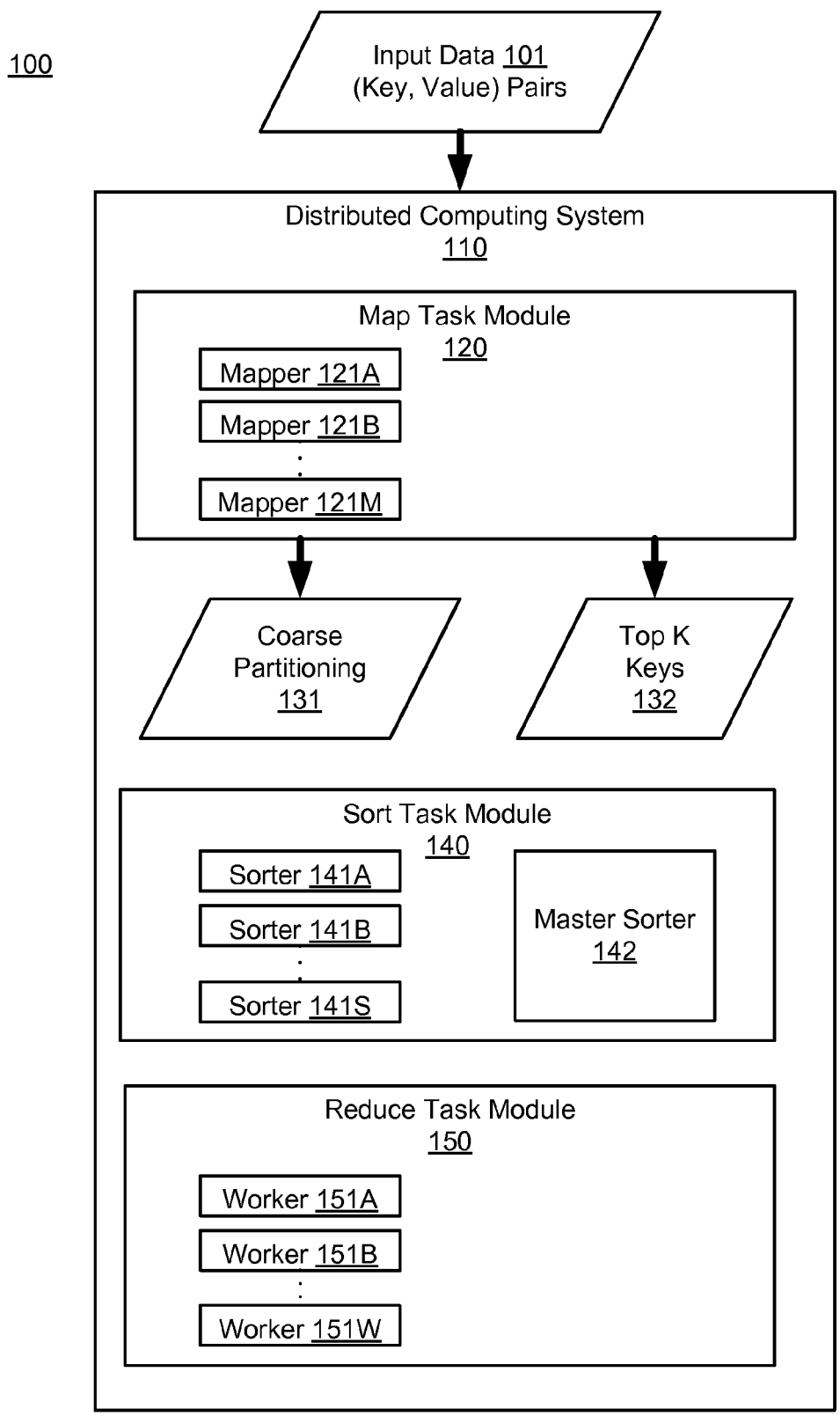
FIG. 1 is a computing environment for a distributed computing system, in accordance with an embodiment of the invention.

FIG. 1 is a computing environment 100 for a distributed computing system, in accordance with an embodiment of the invention. In the computing environment 100, input data 101 streams into the distributed computing system 110.

The input data 101 comprises (key, value) pairs to be processed in the MapReduce job performed by the distributed computing system 110. The input data 101 may be accessed from any storage media or combination of storage media, or streamed across a network, such as the Internet, for example. The input data 101 includes an arbitrary amount of imbalance with respect to the frequency distribution of the data keys in the dataset. In one embodiment, the distributed computing system 110 receives the input data 101 in a random order and has no advanced knowledge of what data keys in the input data 101 are likely to be popular, nor any other knowledge pertaining to the volume or content of input data 101 that may be received by the distributed computing system in a particular timeframe.

The distributed computing system 110 receives the input data 101, executes the MapReduce job on the input data 101, and outputs a result to the MapReduce job. The distributed computing system 110 comprises a plurality of processing units that work together to solve complex and computationally intensive problems. The physical components of a plurality of computer systems that may form parts of the distributed computing system 110 are described below with reference to FIG. 3. As illustrated in FIG. 1, the distributed computing system 110 includes a map task module 120, a coarse partitioning 131, a list of the top K keys 132, a sort task module 140, and a reduce task module 150.

The map task module 120 controls the map phase of the MapReduce job. The map task module 120 employs a plurality of mappers 121A-M in parallel to map the input data 101 to a coarse partitioning 131. Each mapper 121A-M maps a data item to exactly one of the coarse partitions in the coarse partitioning 131, for example, by computing a hash from the input data item. The number of coarse partitions in the coarse partitioning 131 may depend on the number of nodes in the computing cluster and the amount of buffer available in the file system. In one implementation, the number of coarse partitions is 1024, in another implementation with a large amount of data, the number of coarse partitions is 4096.

The map task module 120 generates a list of the top K keys 132 with the highest frequency among the input data 101 as the mappers 121A-M are executing. The number of mappers 121 can vary depending upon the number of processing units available in the distributed computing system 110. The value K is adjustable to accommodate the degree of imbalance that is deemed acceptable and the number of processing units available to devote to the MapReduce job. For example, the value K may be 1,000, or 10,000, or a much higher or lower value.

In one implementation, K is adjusted based on the number of processing units so as to lower the upper bound of the maximum imbalance ratio. Let K represent the number of keys with the highest frequency that will be treated specially to solve the imbalance issue for those keys, and let N denote the number of processing units. Depending on the key distribution, it is then possible that the (K+1)th key has a proportion very close to 1/K. (Note that it must be less than 1/K, otherwise, the sum of the proportions for all keys will be at least $(1/K)*(K+1)>1$.) Suppose the (K+1)th key is assigned to only one processing unit and all other keys go to (N−1) processing units. Then the upper bound for the maximum imbalance ratio for the non-top K keys can be computed as follows:

$$\left(\left(\frac{1}{K}\right) \middle/ 1\right) \middle/ \left(\left(\frac{K-1}{K}\right) \middle/ (N-1)\right) = \left(\frac{(N-1)}{(K-1)}\right) \quad \text{Eq. 1}$$

Based on Eq. 1, when K is larger than or equal to N, the upper bound of the maximum imbalance ratio is no more than 1. Thus, choosing a larger K helps reduce the imbalance ratio, for example, to keep it under a threshold. If a small K is chosen and the upper bound ends up being larger than the threshold, the system is more likely to suffer from some single keys outside of the top K keys that are proportionally large. However, there is a tradeoff. A larger K typically leads to more computational costs during the map stage of the MapReduce process. Additionally, in some embodiments the top K list is broadcast to all workers before the reduce stage of the MapReduce process, so a longer top K list may also lead to additional computational costs related to these communications.

Alternatively or additionally, K is selected based on the key frequency distribution. If the K frequency distribution is a distribution with a long tail, with a large proportion of the number of keys each having small frequencies, a large K is likely to be unnecessary. However, if the probability distribution is roughly linear, a larger K is favored. To demonstrate this point, consider the following example: 102 keys and the top 100 keys have an overall proportion of 99%. The 101st key is 0.99% and the $102^{nd}$ key is 0.01%. The $102^{nd}$ key is so small that it does not significantly add to the processing time of the job. However, $101^{st}$ key is not in the top 100, but it is still relatively large and should be treated as the top K keys are treated to bring down the imbalance ratio.

The map task module 120 may compute a histogram of the distribution of keys encountered dynamically, as the mappers 121A-M are mapping the data. Methods of computation of a top K most frequent items in distributed streams are known to those of skill in the art, and have been described, for example, by Moses Charikar, Kevin Chen, and Martin Farach-Colton, "Finding frequent items in data streams" in Automata, Languages and Programming, pp. 693-703, Springer Berlin Heidelberg, 2002.

It is noted that the top K keys may fluctuate, particularly at the start of processing a new dataset. In one embodiment, to avoid instability of the top K keys, a threshold amount of data, for example $\frac{1}{1000}^{th}$ of the data is consumed before the list of the top K keys 132 used for further processing the data. In other implementations, the top K key computation can be made more efficient for repetitive processes (e.g., the same MapReduce operation on today's data as previously performed on yesterday's data) by saving the top K key list 132 and using it as a starting point.

A sort task module 140 employs a plurality of sorters 141A-S to read the coarse partitioning 131, sort the data, and assign the data to a plurality of buckets. In one implementation, a bucket is as a named queue to hold values. A bucket can be a file and all bucket files are kept in the same directory for a job. There are two types of buckets: single-key buckets in which all queued data items have a single key in common, and multiple-key buckets containing queued data items having several different keys respectively. The sort task module 140 directs the values for the top K most frequent keys to be separated into single-key buckets. The other less frequently occurring keys are assigned to buckets that each have multiple keys assigned to it, for example based on a hash of the key divided by the number of regular multiple-key buckets.

The sort task module 140 includes a plurality of sorters 141A-S and a master sorter 142 to which all the sorters 141A-S report. In one embodiment, the master sorter 142 must receive reports from all sorters 141A-S that the sorting is complete before the reduce task begins.

The reduce task module 150 controls the operation of the reduce phase of the MapReduce job. In one embodiment, a power of 2 workers (e.g., 1, 2, 4, etc.) is assigned to each multiple key bucket. In one implementation, the number of workers assigned per multiple key bucket is equal to the total number of workers divided by the number of multiple key buckets. The reduce task module 150 assigns more than one worker to each single-key bucket. The number of workers to assign to each single-key bucket can be determined based on the respective frequency of the key separated into the single-key bucket and the threshold level of acceptable imbalance in workloads. For example, if the tolerance for imbalance is set at an upper threshold of two times the average worker load, enough workers are assigned to the respective frequency of the popular key so that each worker does not process more than two times the average worker load. The output of the multiple workers assigned to each respective single-key bucket is stitched together. Then, in applications requiring a merge, the output across all of the workers is combined to complete the MapReduce job and obtain the result.

Example Method

Figure 2:
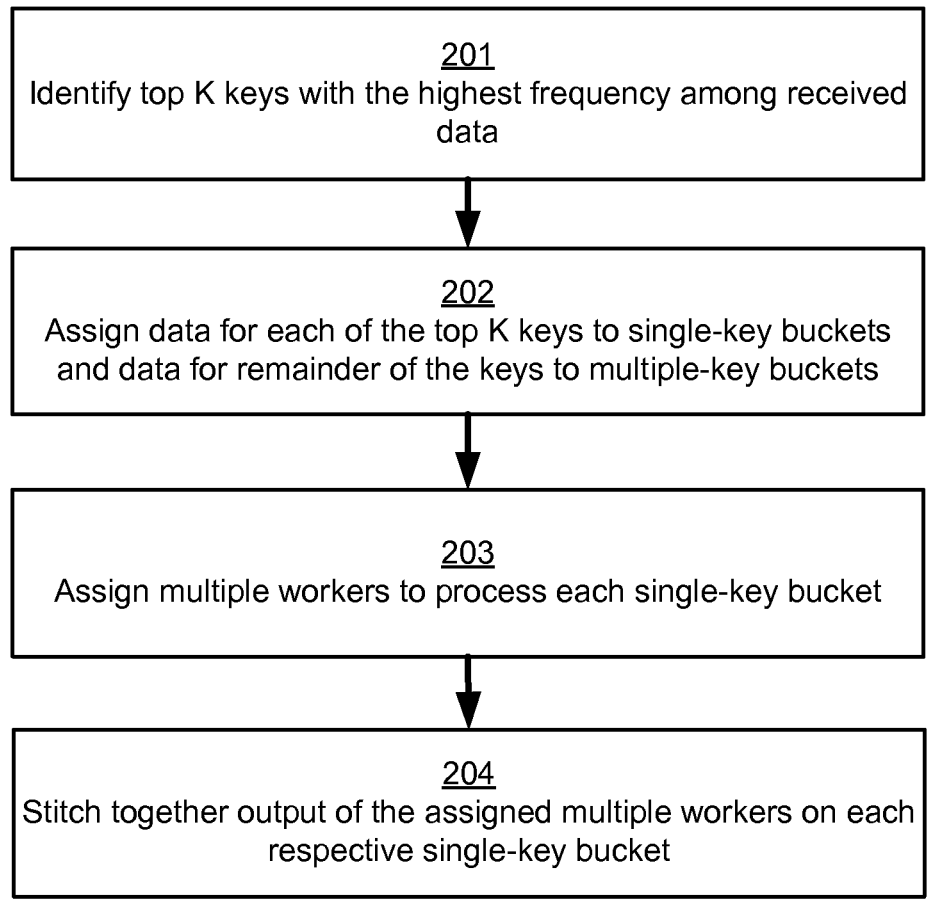
FIG. 2 is a flow chart illustrating a method of load-balancing partitions in an arbitrarily imbalanced distributed MapReduce computation, in accordance with an embodiment of the invention.

FIG. 2 is a flow chart illustrating a method of load-balancing partitions in an arbitrarily imbalanced distributed MapReduce computation, in accordance with an embodiment of the invention. In other embodiments, additional or alternative steps may be performed.

In step 201, the top K keys with the highest frequency among the received data are identified. For example, the top 1,000 keys with the highest frequency in a dataset of 1,000,000 records are identified as the dataset is being processed by the map task module 120. Optionally, the distributed computing system 110 may report the frequency distribution of the top K data keys or all data keys to an administrator for informational purposes.

In step 202, data for each of the top K keys is assigned to a single-key bucket, and data for the remainder of the keys is assigned to multiple-key buckets. Thus, in the above example, the top 1,000 keys with the highest frequency are each assigned to a separate respective one of 1,000 single-key buckets. The other buckets are multiple-key buckets into which the rest of the keys are assigned.

In step 203, multiple workers are assigned to process the data each single-key bucket. The number of multiple workers that are assigned to process a given bucket is based on the number of items in the bucket and the threshold level of acceptable imbalance in workloads. For example, if the average workload is 10,000 records, and the threshold level of acceptable imbalance is 1.5 times the average workload, and a bucket contains 16,000 records, then two workers will be assigned to the bucket.

In step 204, the output of the assigned multiple workers on each respective single-key bucket is stitched together. In one embodiment, this relies on file system support for stitching files and for reading sparse files to allow multiple files output by multiple workers to be combined. The results can be combined across files to obtain the final MapReduce result. In one embodiment, multiple reduce phases are used to reduce the result in steps, for example from 10,000 to 1,000, and then to 100, then to 10, and finally to 1.

The above-described embodiments allow a distributed computing system 110 to flexibly respond to fluctuations in the imbalance in data keys in the input data 101 by dynamically determining the most popular keys and treating them separately so as to prevent processing bottlenecks in MapReduce jobs. Should new data keys suddenly become more popular, the distributed computing system 110 will automatically begin processing the newly popular data keys in the elite single-key buckets to which multiple workers are assigned, and discontinue assigning the keys with waning popularity to single-key buckets, instead assigning them to the common multiple-key buckets. Accordingly, there is no need to expend human-resource hours to intervene in the process to prevent a new load imbalance that would otherwise threaten efficiency.

It is further noted that the above-described embodiments achieve load balancing without resorting to multiple sort steps followed by a merge step. In contrast to methods that break a single large key (such as country=US) by using a composite key (such as country/region={US/Northeast, US/Southeast, US/Midwest, US/Northwest, or US/Southwest}), the above-described embodiments need not perform multiple sort steps. Accordingly, by using a single sort step, the method avoids the computational costs of performing multiple sort steps.

An additional advantage of some embodiments of the invention is that an arbitrarily large single key group can be handled automatically. Prior techniques that re-arrange which keys are assigned to which buckets to more evenly pack the existing buckets only remedy imbalances caused by bucket assignment. Such techniques cannot deal with a single large key group, which will cause imbalance regardless of the bucket to which it is assigned. Embodiments of the described invention assign multiple workers to process the single large key group to prevent unacceptably high degrees of imbalance.

One particular benefit of being capable of handling arbitrarily large single key groups is that the distributed computing system 110 becomes more robust to some types of common errors. For example, assume in the context of a MapReduce job that users use country as the key in a query, but the country is obtained from a function named getCountry( ) written by others. This function could possible return null if there is some special logic in the parsing code or the country field is just missing in the inputs for a period of time. As a result, assume the null Country key is proportionally large, such as 20%. In such a case, embodiments of the invention do not require any code or query change efforts on the user's end. Previously, a whole data pipeline would break due to a large imbalance in the country codes caused by some commonly missing data, which would require a developer to analyze the problem and develop and deploy a solution. Instead, in accordance with one embodiment of the invention, the distributed computing system 110 automatically detects the high frequency key and allocates additional workers to process the abnormally large null group to complete the job.

Physical Components of a Computer System

Figure 3:
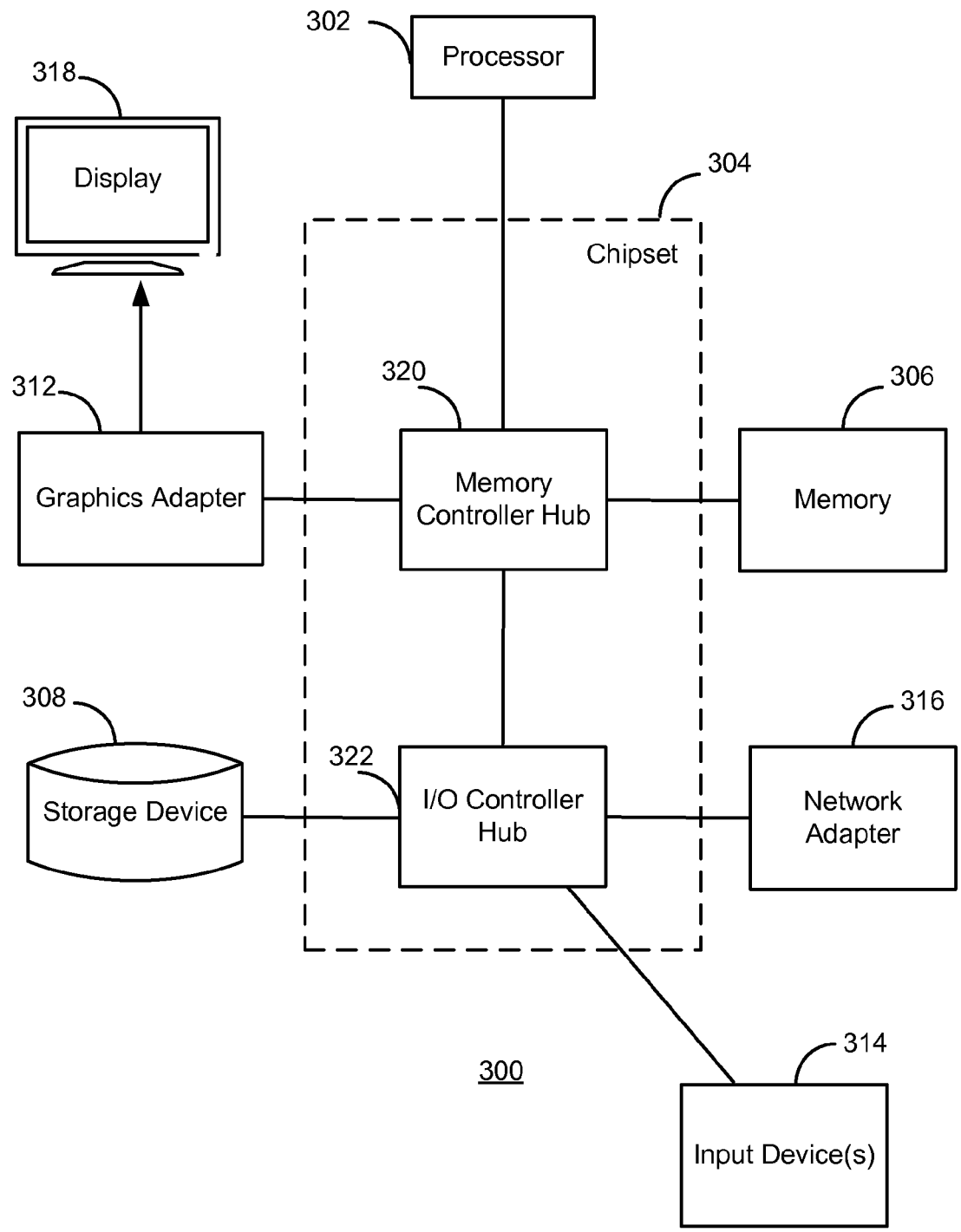
FIG. 3 is an illustration of a high-level block diagram of the components of a computing system for use, for example, within the distributed computing system depicted in FIG. 1, in accordance with an embodiment.

FIG. 3 is an illustration of a high-level block diagram of the components of a computing system for use, for example, within the distributed computing system 110 depicted in FIG. 1, in accordance with an embodiment. Illustrated are at least one processor 302 coupled to a chipset 304. Also coupled to the chipset 304 are a memory 306, a storage device 308, a graphics adapter 312, input device(s) 314, and a network adapter 316. A display 318 is coupled to the graphics adapter 312. In one embodiment, the functionality of the chipset 304 is provided by a memory controller hub 320 and an I/O controller hub 322. In another embodiment, the memory 306 is coupled directly to the processor 302 instead of the chipset 304.

The storage device 308 is any non-transitory computer-readable storage medium, such as a hard drive, compact disk read-only memory (CD-ROM), DVD, or a solid-state memory device. The memory 306 holds instructions and data used by the processor 302. The input device 314 may be a mouse, track ball, a touchpad, or other type of pointing device, typically used in combination with the keyboard to input data into the computer 300. The graphics adapter 312 displays images and other information on the display 318. The network adapter 316 couples the computer 300 to a network.

As is known in the art, a computer 300 can have different and/or other components than those shown in FIG. 3. In addition, the computer 300 can lack certain illustrated components. In one embodiment, a computer 300 acting as a server may lack input device(s) 314, graphics adapter 312, and/or display 318. Moreover, the storage device 308 can be local and/or remote from the computer 300 (such as embodied within a storage area network (SAN)).

As is known in the art, the computer 300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302.

Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

The described embodiments also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the embodiments disclosed herein without departing from the spirit and scope as defined in the claims.

What is claimed is:

1. A computer-implemented method of load-balancing in arbitrarily imbalanced MapReduce job in a distributed computing system, the method comprising:
   identifying K data keys with the highest frequency among received data, the received data comprising pairings of data keys and data values to be processed in the MapReduce job;
   assigning one respective reduce phase worker to process data values corresponding to the data keys of each multiple-key bucket, each multiple-key bucket comprising queued data items having several different keys;
   assigning data for each of the K data keys to a single-key bucket and other data keys to multiple-key buckets;
   assigning multiple reduce phase workers to process data values corresponding to the data key of each single-key bucket, wherein a number of multiple reduce phase workers to assign to a single-key bucket is determined according to a respective frequency of the data key assigned to the single-key bucket and a threshold level of acceptable imbalance in reduce phase worker loads across reduce phase workers; and
   stitching together output of the assigned multiple reduce phase workers on each respective single-key bucket.

2. The method of claim 1, wherein the received data is a data stream.

3. The method of claim 1, wherein the identified K keys with the highest frequency among the received data fluctuates as additional data are received.

4. The method of claim 1, wherein K is a number selected to keep a maximum imbalance ratio under a threshold.

5. The method of claim 1, wherein K is selected based on a frequency distribution of the data keys.

6. The method of claim 1, further comprising reporting a frequency distribution of the K highest frequency data keys.

7. The method of claim 1, further comprising combining output across all reduce phase workers to obtain a result of a MapReduce computation.

8. The method of claim 1, wherein assigning each of the K data keys to a single-key bucket and other data keys to multiple-key buckets comprises a single sort step.

9. The method of claim 1, wherein the single-key bucket for a first data key of the identified K data keys is arbitrarily large compared to other buckets.

10. A nontransitory computer readable storage medium including computer program instructions that, when executed, cause a computer processor to perform operations comprising:
   identifying K data keys with the highest frequency among received data, the received data comprising pairings of data keys and data values to be processed in the MapReduce job;
   assigning one respective reduce phase worker to process data values corresponding to the data keys of each multiple-key bucket, each multiple-key bucket comprising queued data items having several different keys;
   assigning data for each of the K data keys to a single-key bucket and other data keys to multiple-key buckets;
   assigning multiple reduce phase workers to process data values corresponding to the data key of each single-key bucket, wherein a number of multiple reduce phase workers to assign to a single-key bucket is determined according to a respective frequency of the data key assigned to the single-key bucket and a threshold level of acceptable imbalance in reduce phase worker loads across reduce phase workers; and
   stitching together output of the assigned multiple reduce phase workers on each respective single-key bucket.

11. The medium of claim 10, wherein the received data is a data stream.

12. The medium of claim 10, wherein the identified K keys with the highest frequency among the received data fluctuates as additional data are received.

13. The medium of claim 10, wherein K is a number selected to keep a maximum imbalance ratio under a threshold.

14. The medium of claim 10, wherein K is selected based on a frequency distribution of the data keys.

15. The medium of claim 10, wherein the operations further comprise reporting a frequency distribution of the K highest frequency data keys.

16. The medium of claim 10, wherein the operations further comprise combining output across all reduce phase workers to obtain a result of a MapReduce computation.

17. The medium of claim 10, wherein assigning each of the K data keys to a single-key bucket and other data keys to multiple-key buckets comprises a single sort step.

18. The medium of claim 10, wherein the single-key bucket for a first data key of the identified K data keys is arbitrarily large compared to other buckets.

19. A system comprising:
   a computer processor; and
   a computer readable storage medium storing processor-executable computer program instructions, the computer program instructions comprising instructions for:
   identifying K data keys with the highest frequency among received data, the received data comprising pairings of data keys and data values to be processed in the MapReduce job;
   assigning one respective reduce phase worker to process data values corresponding to the data keys of each multiple-key bucket, each multiple-key bucket comprising queued data items having several different keys;
   assigning data for each of the K data keys to a single-key bucket and other data keys to multiple-key buckets;
   assigning multiple reduce phase workers to process data values corresponding to the data key of each single-key bucket, wherein a number of multiple reduce phase workers to assign to a single-key bucket is determined according to a respective frequency of the data key assigned to the single-key bucket and a threshold level of acceptable imbalance in reduce phase worker loads across reduce phase workers; and
   stitching together output of the assigned multiple reduce phase workers on each respective single-key bucket.

* * * * *